Oct. 24, 1967 P. H. SCHULTE 3,348,301

PROCESS FOR MANUFACTURE OF MAGNETIC RECORD-PLAYBACK HEADS

Filed Nov. 1, 1963

INVENTOR
PAUL H. SCHULTE

BY Fisher, Christen, Sabol & Caldwell
ATTORNEYS

United States Patent Office 3,348,301

Patented Oct. 24, 1967

3,348,301

PROCESS FOR MANUFACTURE OF MAGNETIC RECORD-PLAYBACK HEADS

Paul H. Schulte, D-9 Gardenia, San Francisco Urb., Rio Piedras, Puerto Rico 00927

Filed Nov. 1, 1963, Ser. No. 320,705
4 Claims. (Cl. 29—603)

ABSTRACT OF THE DISCLOSURE

This invention comprises the method of manufacture of magnetic record-playback heads which are stamped from a blank of highly permeable magnetic material which is stamped and formed in accurate dies. The pole piece structure is partly cut from the magnetic blanks in proper alignment with one end of each pole piece remaining integrally attached to the blank until all parts are assembled and potted. A single blank comprises two semi-housings adapted for mating and the upper semi-periphery of each semi-housing is embossed outwardly in the region which will be finished away as the face of the head. It is at this point that the pole pieces are attached such that finishing away of the embossed regions serves to sever the pole pieces which remain in accurate alignment because of the potting. Non-magnetic spacer material is disposed between the semi-housings as they are disposed together in the region of the pole pieces so that each pair of pole pieces defines an isolated magnetic path including its gap material. Other components are assembled such as the coil leads and shielding prior to the potting.

The present invention relates to a method of manufacturing magnetic record-playback heads of a type providing precise gap alignment to external indexing structure incorporated therein.

Such heads are thus readily indexible to the path of the magnetic tape via mechanical structure or by electrical sampling and are also adapted for quick operative association with, for example, erase heads or other record or playback heads to form multiple function combination heads. In either event, stringent alinement requirements must be observed, because of current narrow tapes which may include multiple tracks and in which it is necessary to aline the head gaps to the head tracks.

The process of the present invention relates the gap forming structure to external physical indexing structure precisely, through the employment of die-punch techniques.

The outer housing constitutes a shield which is punched and drawn from blanks of high permeable magnetic material. The pole pieces are actually lanced from this outer shield in the same or related dies to form matched counterparts adapted for assembly to comprise a head. The pole pieces remain integrally attached to the housing sections during assembly and until encapsulation, which retains them in the punch and die locations. Thereafter, finishing of the operative face of the head separates the pole piece structures from the outer shielding or housing sections without resort to sawing or cutting, and consequently without inherent inaccuracies which result from such processes.

A feature of the invention resides in the embossing outwardly of the surfaces of the housings which will become the face, except in the regions of the pole pieces. The lancing and forming of the pole pieces maintains the integral attachment regions slightly below the embossed level. Thus, finishing of the assembled head relieves the embossed areas to expose the pole piece structures as islands in the encapsulating filler. This procedure maintains the lanced pole pieces in precise alinement with the slots or apertures in the outer shield from which they are lanced, such that the magnetic gaps formed thereby are precisely indexed to the slot edges appearing externally of the head construction.

A further feature of the invention resides in the slots and wells or apertures from which the pole piece configurations are lanced. These wells may be adapted to receive bosses of heads to be associated therewith, such as erase heads, for instance, in accurate alinement of the erase head gaps to the record-playback gaps. Alternatively, the indexing slots and wells may be employed with mounting structure to aline the individual heads relative to tape tracks and tape path.

Another feature of the invention resides in the lancing and forming of the pole pieces relative to the faces of the housing sections. The pole pieces generally depend from the face to be finished off on the operative face of the head. When opposed housing sections are mated or abutted, the pole pieces, in pairs, define an index gap. Due to the angle at which the pole pieces depend from the tape contact region, the electrical characteristics of the finished head are improved.

A record-playback head of a type contemplated by the present process is described in detail in my co-pending patent application, Ser. No. 320,753, entitled Magnetic Head, filed concurrently herewith.

More particularly, in the processing of the head of the present invention, a suitable blank of highly permeable magnetic material is used to initiate the operation. This blank is generally formed and peripherally flanged to outline, preferably, a pair of housing sections comprising opposite portions of the blank. Openings are punched through the so-formed blank to permit tool room to define integral component outlines and to afford mounting holes and epoxy keyways.

Thereafter, at a further station the outer peripheries are embossed outwardly in the region which will eventually be finished off in the tape-to-head contact areas. At further stations the pole pieces are lanced from the housing sections to form the core or inner-most regions thereof, but they remain attached in precise relationship to the slots from which they were lanced.

In assembly, two such housing sections are mated together with coils arranged on their abutting pole pieces. The coils and their connections are epoxied in position with the pole pieces such that the face of the head may then be finished to separate the pole piece structure to form isolated magnetic paths with the gaps thereof (formed by non-magnetic spacers between the pole piece faces) in the positions dictated by the original formed blanks.

Accordingly, it is among the objects of the invention to provide a method of manufacture for producing magnetic housings suitable for forming magnetic record-playback heads.

It is a further object of the invention to process such housings in mated pairs of housing sections for association to form a magnetic head.

Another object of the invention is the provision of such a process wherein the pole piece structures are lanced from the housing to leave indexing slots in predetermined precise alinement with the gaps formed by the pole pieces.

A further object of the invention is the provision of a process for making head housings which can be assembled into heads with external indexing structure for operative association with other heads to provide precise gap-to-gap alinement.

It is yet another object of the invention to provide a process capable of taking advantage of the inherent accuracies of die techniques for providing magnetic housings for magnetic heads with precise gap indexing integrally incorporated.

The foregoing will become more apparent to those skilled in the art from a reading of the following detailed description of a preferred embodiment of the invention, taken in conjunction with the accompanying drawing, wherein.

Figure 2:
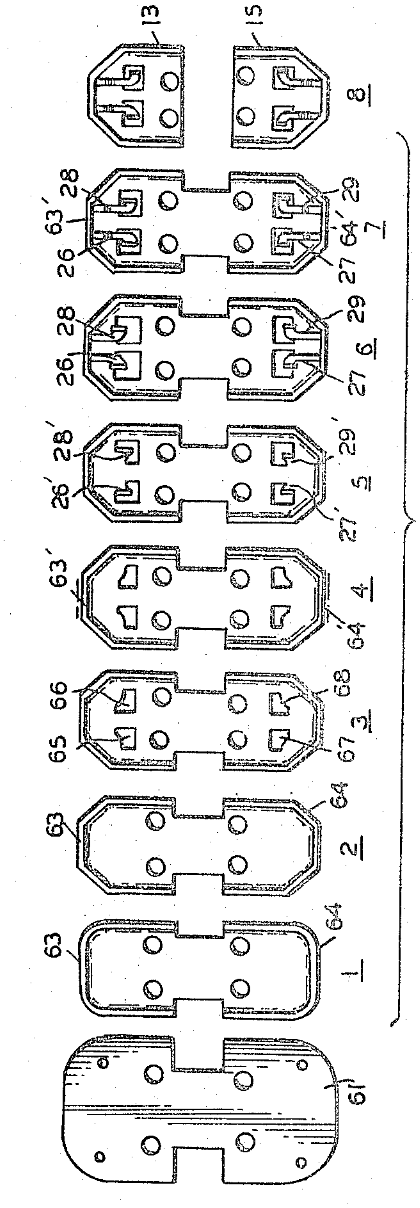
FIG. 2 is a plan view of a blank of magnetic material being processed through several stages of punching and drawing to form the housing sections of FIG. 1.
Figure 1:
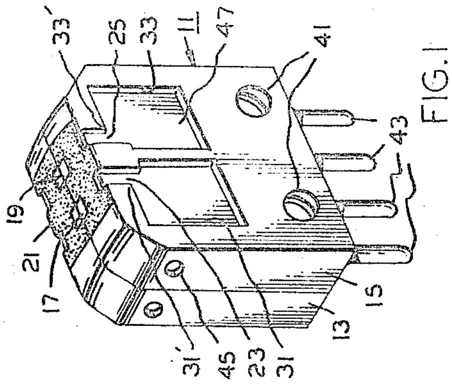
FIG. 1 is a view in perspective of a record-playback head made in accordance with the process herein described.

Referring now to the drawing and particularly to FIG. 1, there is illustrated a record-playback head 11 formed by the mating of a pair of housing sections 13 and 15, developed by the punch and die techniques of FIG. 2.

The head of FIG. 1 includes pole faces 17 and 19 forming, respectively, a set of spaced apart gaps in the upper or operative face of the head. These pole faces are visible as islands in the epoxy filler 21. Their gaps are in precise alinement with the slots 23 and 25 which are actually formed by lancing the pole pieces from the housing section 15, such pole pieces being visible at 27' and 29 in FIG. 3. The slots 23 and 25 open into wells 31 and 33 (FIG. 1) which are formed, generally, as a result of the pole piece material being lanced from the housing 15. Since the wells or recesses 31 and 33 are also formed in the die stations, their edges are accurately indexed to the slots 23 and 25, in turn in alinement with the gaps of the pole faces 17 and 19. It may be appreciated that the outer housing is apertured at 41 to permit mounting screws to assemble the head to other heads as, for example, erase heads or to brackets for operation as a single head. Also, external terminals 43 are provided in connection with internal components for plug-in operation of the head. Other apertures shown as the small holes 45 serve to key the epoxy filler 21 to the housing sections 13 and 15. A typical association of the head of FIG. 1 with a complementary erase head, in indexed alinement, is described in my co-pending application, Ser. No. 320,887, entitled, "Process for Making Combination Magnetic Head," filed concurrently herewith.

The apertures or wells 31 and 33 are closed by a non-magnetic plate 47 prior to encapsulating the housing and thus the plate 47 serves as a magnetic isolator, as well as completes the housing for epoxying.

The process which enables the punching and drawing of the magnetic housing sections 13 and 15 is best illustrated in FIG. 2. The blank 61 of magnetic material having high permeability forms the starting point for die and punch processing, which of course may be carried out at single stations, as depicted or otherwise, following well known principles. In any event, the blank at station 1 is formed with peripheral flanges 63 and 64 on opposed end portions which will become the housing sections 13 and 15. Further forming of the flanged peripheries 63 and 64 is carried out at station 2.

At station 3, apertures 65 through 68 are formed at corresponding positions in the opposite end portions of the blank and have a unique configuration which serves in the shaping of the pole pieces to be lanced from the material adjacent to these apertures.

Station 4 is provided to illustrate the embossing of the extreme outer periphery portions 63' and 64' in a direction outwardly of the blank or semi-enclosures being formed by the housing sections.

Lancing of the core sections of the pole pieces is shown carried out at station 5. The core tips 26' and 28' (FIGS. 2 and 4) are shown formed normal to the plane of the blank at station 5. Similarly, the core portions 27' and 29' of the pole pieces 27 and 29 (FIGS. 2 and 3) are similarly formed in the end portion which will become housing 15.

Station 6 shows lancing of the stem portions of the pole pieces 26 and 28, as well as pole piece stems 27 and 29 from the blank with the pole pieces being spaced from the plane of the latter.

At station 7, the outer extremities of the pole pieces are formed at angles of approximately 45° from the embossed periphery portions 63' and 64'; and, at station 8 all portions are restruck and the housing sections 13 and 15 are cut from the original blank.

The assembly of the record head is best described in the referenced co-pending applications. However, it may be noted that from FIG. 4 coils 71 and 73 are adapted to fit on the cores 26' and 28' of housing section 13, which in turn are butted by the cores 27' and 29' of the housing section 15 when the two sections are mated. Other isolation structure, such as the magnetic isolator plates 47, are preferably included in the assembly and all internal components are encapsulated to secure the housings together with the components together in proper position.

Figure 4:
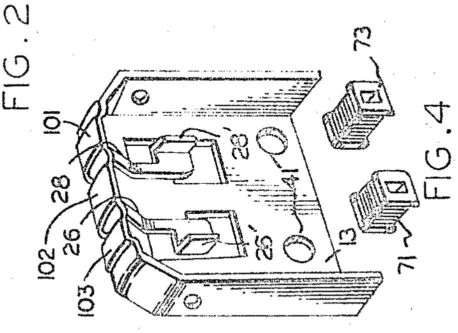
FIG. 4 is a view in perspective of a housing section, as viewed internally, and including certain components for association therewith.
Figure 3:
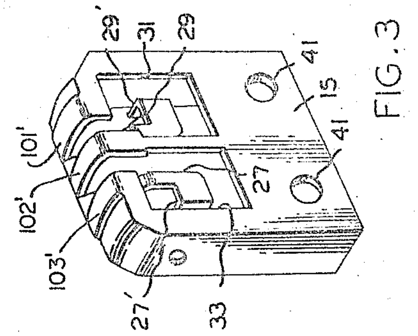
FIG. 3 is a view in perspective of one of the housing sections as viewed externally.

Thereafter, finishing off of the embossed surfaces, identified at 63' and 64' in FIG. 2, and at 101, 102, and 103 in FIG. 4 and at 101', 102', and 103' in FIG. 3, serves to form the face, shown in FIG. 1, with the pole pieces now separated from the outer housing or shell, but with gaps formed thereby (due to non-magnetic spacer inserts between the housing sections 13 and 15 when they are brought into opposed relation). The pole faces 17 and 19 appear as islands in the epoxy filler 21. The magnetic paths of each gap are similarly completely magnetically isolated from the other structure.

It will be noted that the alinement of the gaps of pole faces 17 and 19 to the slots 23 and 25 serves to permit indexing from wells 31 and 33 and/or slots 23 and 25 directly to the gaps, whether for association of the head in combination with erase heads or employment of the head in a bracket for alinement purposes.

From a reading of the foregoing detailed description, when taken in conjunction with the accompanying drawing, other and further embodiments will become apparent to those skilled in the art. Therefore, it is intended that my invention be limited only by the appended claims, wherein:

What I claim is:

1. A method of manufacture of housings for magnetic record-playback heads comprising the steps of: forming a blank of high permeable magnetic material into similar peripherally flanged semi-enclosures; embossing opposite corresponding peripheral portions of the semi-enclosures outwardly; lancing material from the enclosures at corresponding positions without severing the same from the embossed portions; forming the lanced material to depend from said surfaces at angles approximating 45° and with off-set right angle portions on the ends thereof lanced from the semi-housings; and severing the blank into similar semi-enclosures for association.

2. A method of making a magnetic shell for a magnetic record-playback head having a face with pole pieces and gaps comprising the steps of: forming a blank into a peripheral flanged flat wall configuration; removing material from at least one location in the wall to leave an aperture therethrough; embossing outwardly a portion of the flanged periphery corresponding to the face; lancing further material from the region of the aperture to expand the aperture but without severing the material from the embossed peripheral portion; forming the lanced material at an angle of approximately 45° to said portion and parallel to and spaced from said wall and oriented normal to said wall at the extremity thereof; the neck of said material being lanced to leave a slot in said portion in communication with the aperture in said wall and the end of the neck at its position of integral attachment to said portion being disposed directly across the slot in said portion and between parallel lines extending the slot in said wall, whereby the lanced material is in accurate alignment with the slot.

3. A process for manufacturing record-playback heads from magnetic material having a high permeability rating comprising the steps of: forming a pair of partly peripherally flanged housing sections adapted to be abutted together to form an enclosure; lancing inwardly spaced apart portions of each housing section during the forming to provide pole piece structures integrally attached only at the peripheral flange; embossing outwardly similar portions of the peripherally flanged housing sections including the attachment of the pole pieces; disposing non-magnetic material between the edges of said portions of the housings when abutted and in alinement with the pole piece structures; disposing electrical coil means on each of said pole piece structures; potting the enclosure; and, finishing away the embossed portions to expose faces of said pole piece structures.

4. A method of making magnetic housings for association to comprise record-playback heads comprising the steps of: peripherally flanging a blank of magnetic material of high permeability; embossing outwardly a portion of the peripheral flange; lancing and forming a pole piece structure from the material with integral connection maintained at the edge of said portion; said lancing and forming disposing the pole piece structures in alinement with the slots from which they are lanced; disposing flux producing means on the pole pieces; said forming off-setting the pole pieces to accommodate the flux producing means; magnetically shielding and isolating the flux producing means; associating a pair of the peripherally flanged so-formed blanks in opposed relation to form an enclosure disposing non-magnetic gap spacer material between the embossed portions as they are associated; potting the enclosure; and, finishing off the embossed portions to disconnect the pole pieces from the portions.

References Cited

UNITED STATES PATENTS

| | | | |
|---|---|---|---|
| 2,320,566 | 6/1943 | Carlile | 29—416 X |
| 2,384,145 | 9/1945 | Voity | 29—416 X |
| 3,222,461 | 12/1965 | Wood. | |
| 3,233,046 | 2/1966 | Moehring. | |

JOHN F. CAMPBELL, *Primary Examiner.*

J. CLINE, *Assistant Examiner.*